United States Patent
Jaradi et al.

(10) Patent No.: US 10,562,486 B2
(45) Date of Patent: Feb. 18, 2020

(54) ANTI-RATTLE SEATBELT ASSEMBLY

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 145 days.

(21) Appl. No.: 15/815,890

(22) Filed: Nov. 17, 2017

(65) Prior Publication Data

US 2019/0152429 A1 May 23, 2019

(51) Int. Cl.
*B60R 22/30* (2006.01)
*B60R 22/02* (2006.01)
*B60R 22/18* (2006.01)

(52) U.S. Cl.
CPC ............ *B60R 22/30* (2013.01); *B60R 22/023* (2013.01); *B60R 2022/021* (2013.01); *B60R 2022/1812* (2013.01)

(58) Field of Classification Search
CPC .............. B60R 22/30; B60R 2022/021; B60R 2022/1812; B60R 22/023
See application file for complete search history.

(56) References Cited

U.S. PATENT DOCUMENTS

| 5,957,499 A | * | 9/1999 | Kempf | B60R 22/023 |
|---|---|---|---|---|
| | | | | 280/801.1 |
| 8,308,244 B2 | * | 11/2012 | Parker | B60N 2/36 |
| | | | | 297/481 |
| 9,089,170 B2 | * | 7/2015 | Muratore, II | A41B 15/02 |

FOREIGN PATENT DOCUMENTS

| DE | 102011112989 A1 | 3/2012 | | |
|---|---|---|---|---|
| DE | 102015202517 A1 | 8/2016 | | |
| EP | 1240058 B1 | 12/2004 | | |
| EP | 3312058 A1 | * 4/2018 | ............ | B60R 22/02 |
| KR | 101133593 B1 | 7/2011 | | |

* cited by examiner

*Primary Examiner* — Paul N Dickson
*Assistant Examiner* — Joselynn Y Sliteris
(74) *Attorney, Agent, or Firm* — Frank A. MacKenzie; Bejin Bieneman PLC (57) ABSTRACT

A system includes a vehicle body and a seatbelt assembly attached to the vehicle body. The seatbelt assembly includes a webbing and a tongue slidably engaged with the webbing. A pocket is fixed to the webbing. The pocket and the webbing define a cavity therebetween. A magnet is disposed in the cavity and is engageable with the tongue. The magnet is fixed to the webbing.

8 Claims, 8 Drawing Sheets

ANTI-RATTLE SEATBELT ASSEMBLY

BACKGROUND

A vehicle may include a passenger seat, i.e., the seat occupied by an occupant other than a driver. The vehicle may include a seatbelt assembly disposed between a pillar trim and the passenger seat. The seatbelt assembly may include a webbing and a tongue moveable relative to the webbing. During operation of the vehicle, the passenger seat may be unoccupied, and the tongue may hang freely from the webbing. In this situation, the tongue may move, e.g., vibrate, in a cross-vehicle direction and contact one of the seat and the pillar trim causing a sound, e.g., a rattle.

DETAILED DESCRIPTION

A system includes a vehicle body and a seatbelt assembly attached to the vehicle body. The seatbelt assembly includes a webbing and a tongue slidably engaged with the webbing. A pocket is fixed to the webbing. The pocket and the webbing define a cavity therebetween. A magnet is disposed in the cavity and is engageable with the tongue. The magnet is fixed to the webbing.

The webbing may be elongated along a webbing axis. The tongue may be moveable relative to the webbing along the webbing axis. The magnet may be disposed along the webbing axis.

The tongue may be moveable to a stowed position in the cavity. The tongue may be releasably engaged with the magnet in the stowed position.

The tongue may be moveable to an external position adjacent the pocket external to the cavity. The pocket may be sandwiched between the tongue and the magnet when the tongue is in the external position.

The pocket may be positioned to selectively receive the tongue.

The system may include a pillar trim attached to the vehicle body and a seat spaced from the pillar trim in a cross-vehicle direction. The seatbelt assembly may be disposed between the pillar trim and the seat.

The system may include a second magnet fixed to the pillar trim and engageable with the magnet.

The system may include a third magnet fixed to the seat and engageable with the tongue. The tongue may simultaneously engageable with the magnet and the third magnet between the magnet and the third magnet.

Figure 1A:
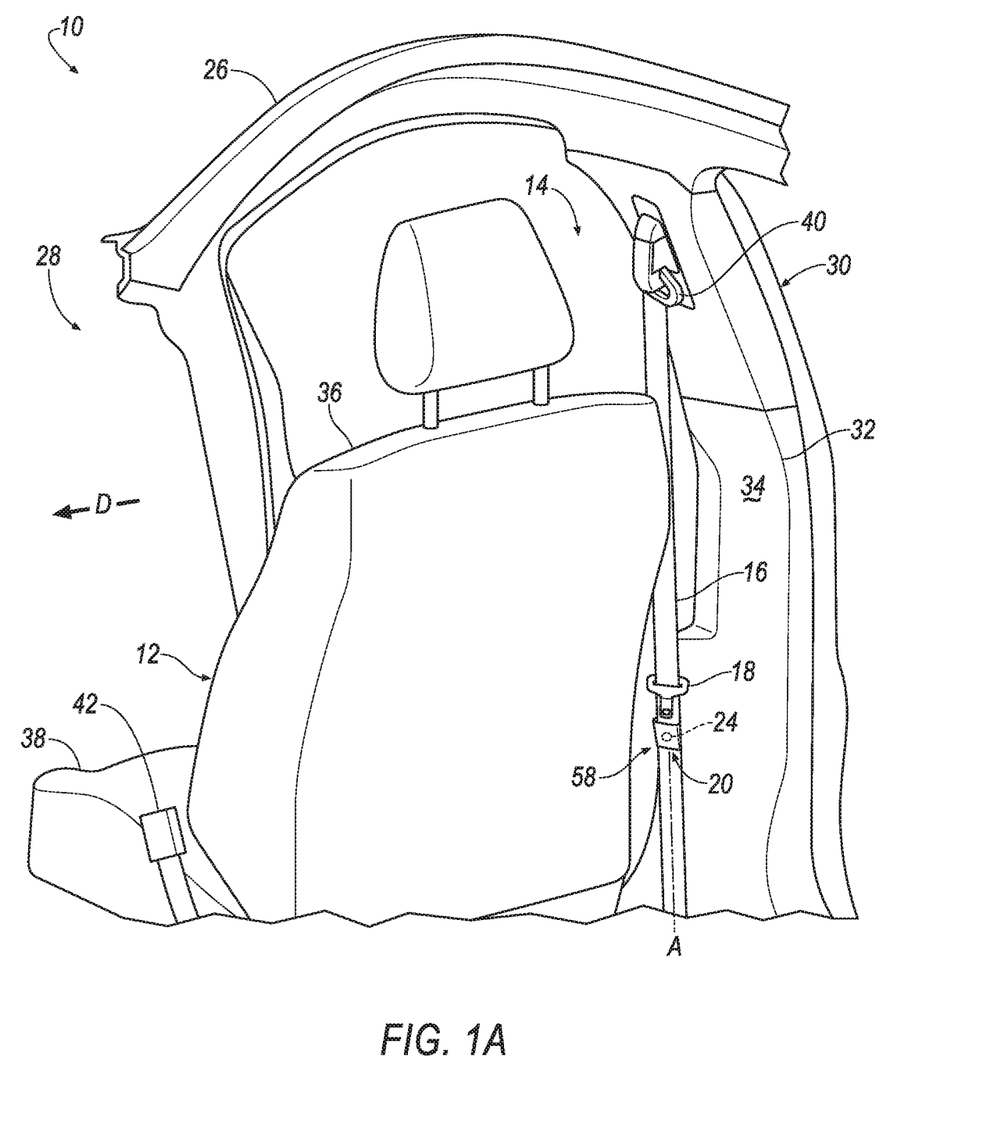
FIG. 1A is perspective view of a vehicle body including a seatbelt assembly having a webbing and a tongue slidably engaged with the webbing.
Figure 1B:
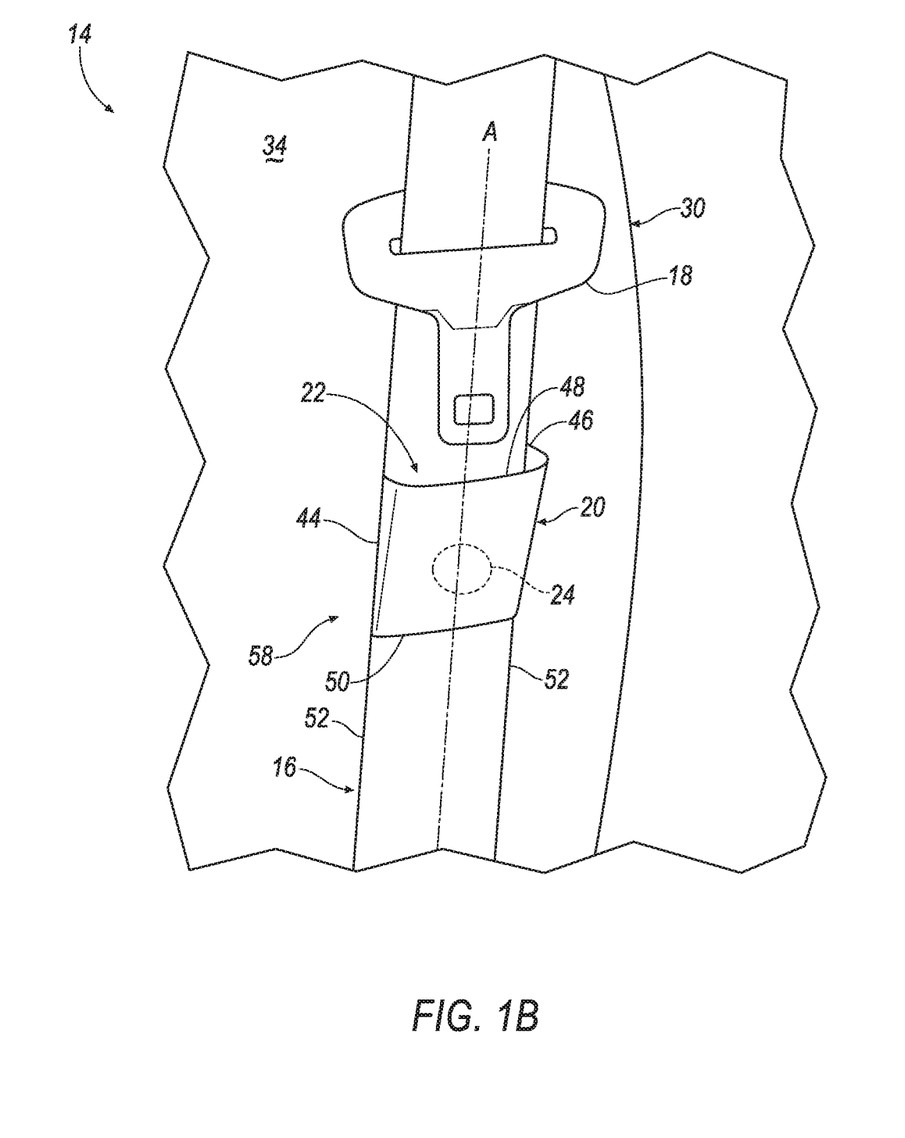
FIG. 1B is a magnified view of the seatbelt assembly including a pocket fixed to the webbing and a magnet disposed between the pocket and the webbing.
Figure 2A:
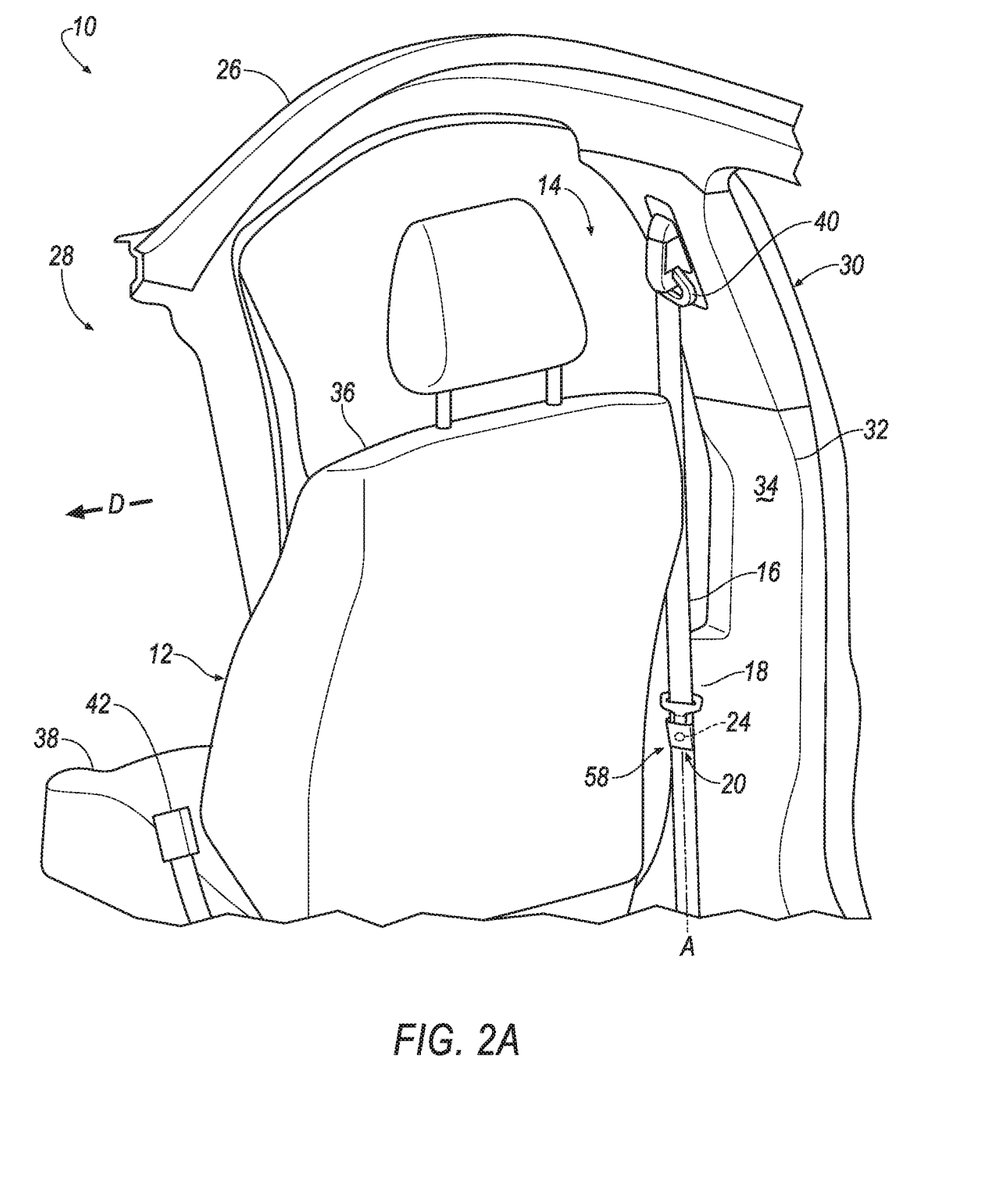
FIG. 2A is a perspective view of the seatbelt assembly with the tongue engaged with the magnet in a stowed position.
Figure 2B:
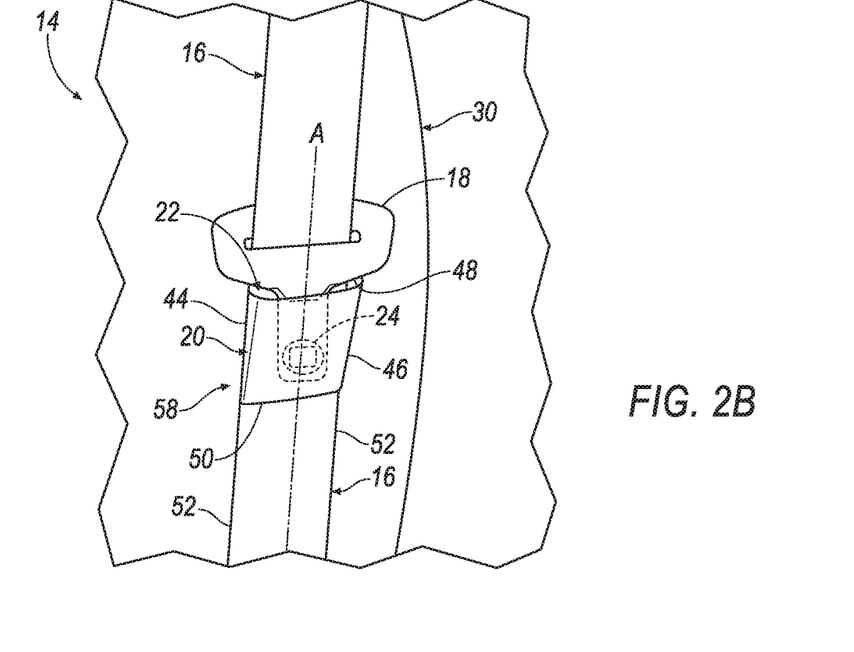
FIG. 2B is a magnified view of the tongue in the stowed position disposed in a cavity between the pocket and the webbing.
Figure 2C:
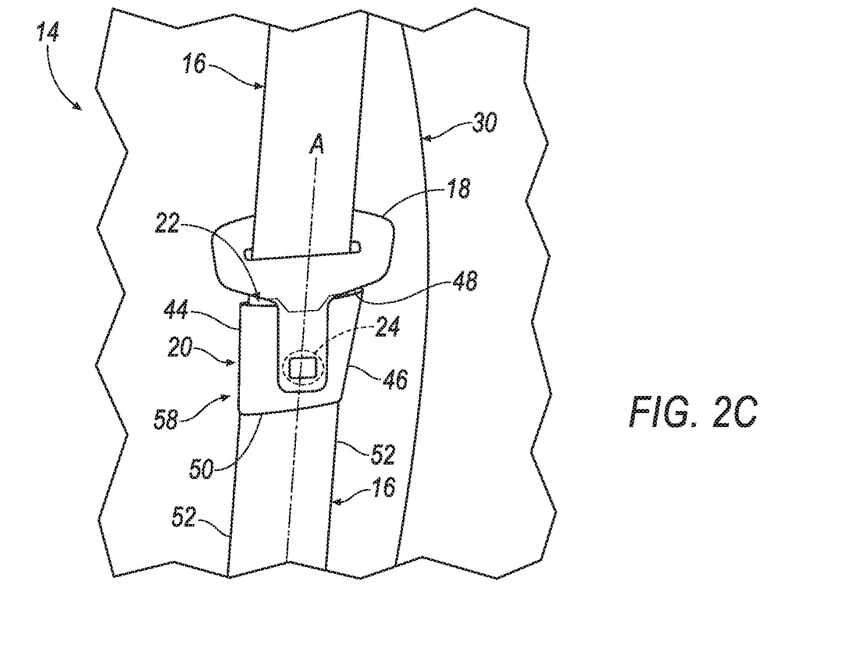
FIG. 2C is a magnified view of the tongue in the stowed position with the tongue external to the cavity and the pocket sandwiched between the tongue and the magnet.

With reference to the Figures, wherein like numerals indicate like parts throughout the several views, a vehicle 10 is generally shown. The vehicle 10 includes a seat 12 and a seatbelt assembly 14 having a webbing 16 and a tongue 18 slidably engaged with the webbing 16. The tongue 18 may be moveable relative to the webbing 16 from a disengaged position, as shown in FIGS. 1A and 1B, to a stowed position, as shown in FIGS. 2A-2C. During operation of the vehicle 10, the tongue 18 may be in the disengaged position when the seat 12 is unoccupied. In this situation, the tongue 18 may be move freely along the webbing 16 due to gravity and/or momentum of the vehicle 10. In other words, the tongue 18 may move relative to the webbing 16 towards other vehicle components.

With reference to FIGS. 1B and 2B, the seatbelt assembly 14 includes a pocket 20 fixed to the webbing 16. The pocket 20 and the webbing 16 define a cavity 22 therebetween. The seatbelt assembly 14 includes a magnet 24 disposed in the cavity 22. The magnet 24 is engageable with the tongue 18. The magnet 24 is fixed to the webbing 16. As the tongue 18 moves relative to the webbing 16 towards the magnet 24, the tongue 18 engages the magnet 24 in the stowed position. By engaging the tongue 18, the magnet 24 fixes the tongue 18 relative to the webbing 16, which may prevent the tongue 18 from impacting other vehicle components and may assist in reducing sound due to the tongue 18 vibrating against the webbing 16.

With reference to FIG. 1A, the vehicle 10 may, for example, by any suitable type of automobile. The vehicle 10 may include a vehicle body 26 defining a passenger cabin 28 to house occupants, if any, of the vehicle 10. The vehicle body 26 may include an A-pillar (not shown) and a B-pillar 30 spaced from the A-pillar. The B-pillar may extend from a roof (not shown) to a floor (not shown). The vehicle body 26 may include additional pillars spaced from the B-pillar 30, e.g., a C-pillar, etc.

A pillar trim 32 may be attached to the B-pillar 30. The pillar trim 32 may extend at least partially along the B-pillar 30. For example, the pillar trim 32 may be monolithic, e.g., a single piece extending from the roof to the floor. As another example, the pillar trim 32 may include a plurality of components that are separately formed and subsequently attached together, as shown in FIG. 1A. The pillar trim 32 may include a surface 34 facing the occupants of the passenger cabin 28. In other words, the surface 34 of the pillar trim 32 may face towards the seat 12, i.e., away from the B-pillar 30. The pillar trim 32 may be attached to the B-pillar 30 by in any suitable manner, e.g., clips, fasteners, etc.

With continued reference to FIG. 1A, one or more seats 12 may be disposed at a front (not numbered) of the passenger cabin 28, e.g., adjacent to the B-pillar 30. In this situation, the seats 12 may be front seats. The passenger cabin 28 may include one or more rear seats (not shown) disposed behind the front seats. The passenger cabin 28 may also include third-row seats (not shown) at a rear (not numbered) of the passenger cabin 28, in which case the seats 12 may be second-row seats (not numbered) instead of or in addition to being front seats. As shown in FIG. 1A, the seat 12 is a bucket seat, but the seat 12 may be other suitable types of seat, e.g., a bench seat.

With continued reference to FIG. 1A, the seat 12 may be spaced from the pillar trim 32 in a cross-vehicle direction D. The seat 12 may include a seatback 36 and a seat bottom 38. The seatback 36 may be supported by the seat bottom 38 and may extend upwardly from the seat bottom 38. The seatback 36 may be stationary or movable relative to the seat bottom 38. The seatback 36 and/or the seat bottom 38 may be adjustable in multiple degrees of freedom. Specifically, the seatback 36 and/or the seat bottom 38 may themselves be adjustable, in other words, may have adjustable components within themselves, and/or may be adjustable relative to each other.

With continued reference to FIG. 1A, the seatbelt assembly 14 may be disposed between the seat 12 and the pillar trim 32 such that the webbing 16 is spaced from each the seat 12 and the pillar trim 32 in the cross-vehicle direction D. The seatbelt assembly 14 may be fixed to the vehicle body 26. Specifically, the seatbelt assembly 14 may include a seatbelt retractor (not shown) and a D-ring 40 spaced from the seatbelt retractor each fixed to the vehicle body 26, e.g., the B-pillar 30. The D-ring 40 may be engaged with the webbing 16. For example, the webbing 16 may freely slide through the D-ring 40. The D-ring 40 may be fixed to the vehicle body 26, e.g., the B-pillar 30, in any suitable manner, e.g., fasteners.

The webbing 16 is retractably payable from the seatbelt retractor. The seatbelt retractor may be mounted to the vehicle body 26 adjacent the seat 12. For example, the seatbelt retractor may be fixed to the B-pillar 30 when the seatbelt assembly 14 is adjacent the front seat. As another example, when the seatbelt assembly 14 is adjacent the rear seat, the seatbelt retractor may be attached to the C-pillar. Alternatively, the seatbelt retractor may be attached to the seat 12. The seatbelt retractor may be attached to the vehicle body 26 in any suitable manner, e.g., fasteners.

The seatbelt assembly 14 may include an anchor (not shown) coupled to the webbing 16, and the tongue 18 engages a buckle 42. The seatbelt assembly 14 may be disposed adjacent the seat 12. For example, the seatbelt assembly 14 is adjacent the front seat, as shown in FIG. 1A. In other words, the seatbelt assembly 14 is disposed between the pillar trim 32 and the seat 12. The seatbelt assembly 14, when fastened, retains the occupant on the seat 12, e.g., during sudden decelerations of the vehicle 10.

The anchor may, for example, be fixed to the seat 12. Alternatively, the anchor may be fixed to the vehicle body 26, e.g., the B-pillar 30, the floor, etc. The anchor may be attached to the seat 12 in any suitable manner, e.g., with fasteners.

The webbing 16 may extend continuously from the seatbelt retractor to the anchor. For example, one end of the webbing 16 feeds into the seatbelt retractor, and the other end of the webbing 16 is fixed to the anchor. With reference to FIG. 1A, the webbing 16 is elongated along a webbing axis A. For example, the webbing 16 is elongated along the B-pillar 30, i.e., from the seatbelt retractor to the D-ring 40. The webbing 16 may be formed of fabric, e.g., woven nylon.

The seatbelt assembly 14 may be a three-point harness, meaning that the webbing 16 is attached at three points around the occupant when fastened: the anchor, the seatbelt retractor, and the buckle 42. The seatbelt assembly 14 may, alternatively, include another arrangement of attachment points.

The seatbelt assembly 14 may include an anti-rattle system 58 having the pocket 20 and the magnet 24, as shown in FIG. 1B. The tongue 18 is releasably engageable with the magnet 24 in the stowed position. When the tongue 18 is engaged with the magnet 24, the magnet 24 fixes the tongue 18 relative to the webbing 16. Additionally, the pocket 20 may assist in limiting movement of the tongue 18 relative to the webbing 16 when the tongue 18 is in the stowed position, as shown in FIG. 2B.

With reference to FIG. 1B, the pocket 20 may be positioned to selectively receive the tongue 18. For example, the pocket 20 may be disposed along the webbing axis A. In other words, the tongue 18 may slide along the webbing 16 to the pocket 20. The pocket 20 may be disposed at any suitable location along the webbing axis A. For example, the pocket 20 may be disposed adjacent to the seat bottom 38 of the seat 12.

With reference to FIG. 1B, the pocket 20 may include two sides 44, 46 spaced from each other and extending along the webbing axis A, a top 48 and a bottom 50 spaced from each other and each extending from one side 44 to the other side 46. The sides 44, 46 of the pocket 20 may be disposed along a periphery 52 of the webbing 16. Each side 44, 46 and the bottom 50 of the pocket 20 may be fixed to the webbing 16. The top 48 of the pocket 20 may be spaced from the webbing 16 in the cross-vehicle direction D.

The pocket 20 may be formed of a same or different material as the webbing 16. The pocket 20 may, for example, be formed of fabric, e.g., woven nylon. The pocket 20 may be fixed to the webbing 16 in any suitable manner, e.g., stitching.

The cavity 22 may extend from the pocket 20 to the webbing 16 in the cross-vehicle direction D. The cavity 22 may, for example, be sized to receive the tongue 18. For example, the cavity 22 may extend along the webbing axis A such that the tongue 18 may be disposed in the cavity 22, as shown in FIG. 2B. The tongue 18 may extend any suitable amount into the cavity 22. For example, the tongue 18 may extend to the bottom 50 of the pocket 20. Alternatively, the tongue 18 may extend to a location between the top 48 and the bottom 50 of the pocket 20.

As set forth above, the magnet 24 is disposed in the cavity 22, as shown in FIGS. 1A-2C. The magnet 24 may be disposed at any suitable position in the cavity 22, i.e., between the top 48 and the bottom 50 of the pocket 20. The magnet 24 may, for example, be disposed along the webbing axis A. The magnet 24 may extend through the webbing 16 in the cross-vehicle direction D. For example, the webbing 16 may include a hole (not numbered) extending in the cross-vehicle direction D and the magnet 24 may be disposed in the hole (not numbered) of the webbing 16.

The magnet 24 may be fixed to the webbing 16 in any suitable manner, e.g., stitching, clips, adhesive, etc. The magnet 24 may be a permanent magnet. The magnet 24 may be any suitable type of magnet. For example, the magnet 24 may be a rare earth magnet, e.g., neodymium magnets or samarium-cobalt magnets. Alternatively, the magnet 24 may be ferromagnetic, e.g., iron, nickel, cobalt, etc.

The magnet 24 may have any suitable shape. For example, the magnet 24 may be disc shaped. In this situation, the magnet 24 may be centered on the webbing axis A. As another example, the magnet 24 may be rectangular. In this situation, the magnet 24 may be elongated along the webbing 16 transverse to the webbing axis A, i.e., from one side of the pocket 20 to the other side of the pocket 20.

Figure 3A:
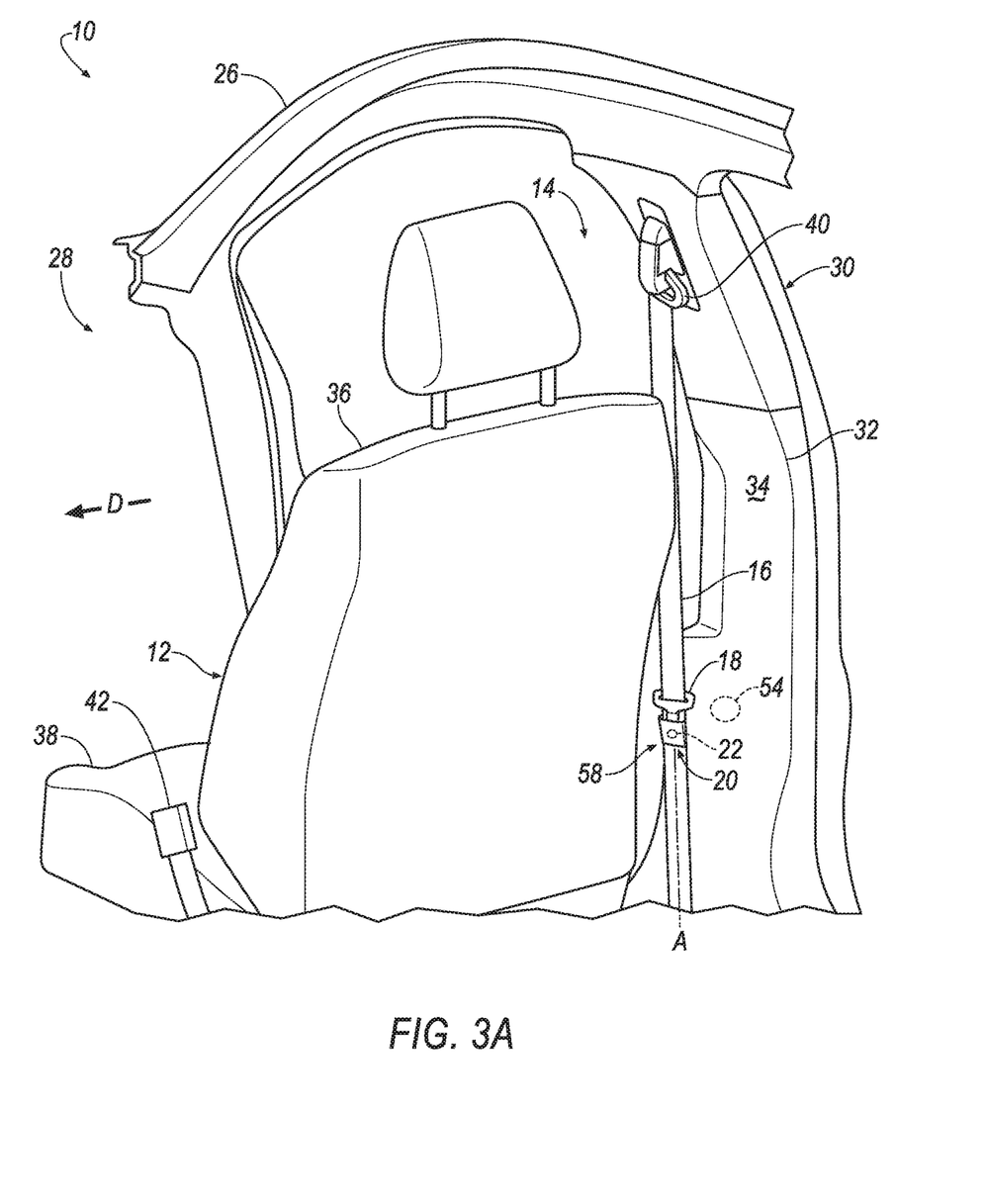
FIG. 3A is a perspective view of the vehicle body including a pillar trim having a second magnet engageable with the magnet.
Figure 4A:
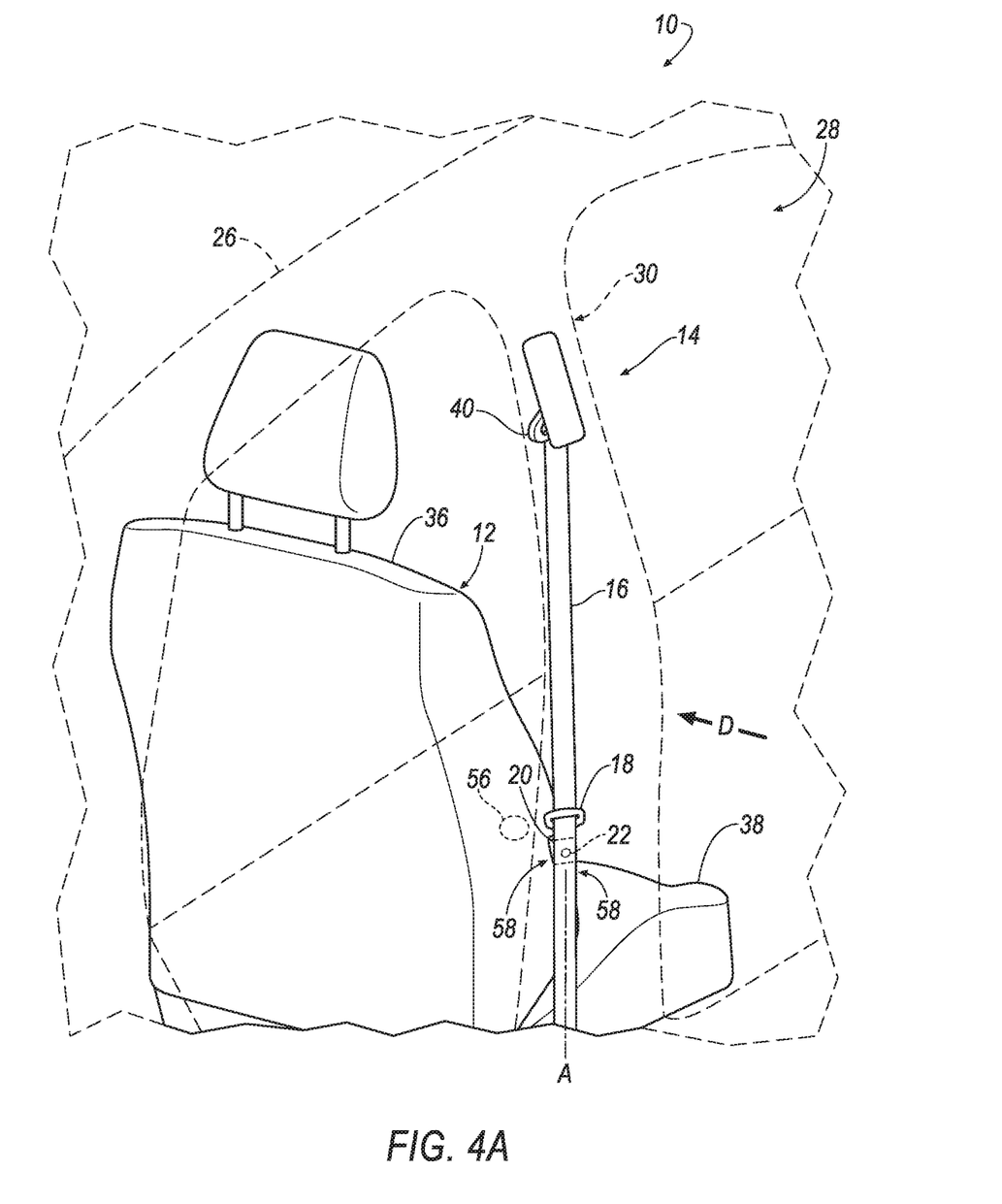
FIG. 4A is a perspective view of a seat including a third magnet engageable with the tongue.

With reference to FIG. 3A, the anti-rattle system 58 may include a second magnet 54 fixed to the pillar trim 32 and/or, as shown in FIG. 4A, the anti-rattle system 58 may include a third magnet 56 fixed to the seatback 36. As set forth below, the magnet 24 may be engaged with the second magnet 54 to fix the webbing 16 and the pocket 20 to the pillar trim 32. Alternatively, the magnet may be engaged with the third magnet 56 to fix the webbing 16 and the pocket 20 to the seatback 36. In the example shown in FIGS. 3A and 4A, the anti-rattle system 58 may include both the second magnet 54 and the third magnet 56. As another example, the anti-rattle system 58 may include the second magnet 54 and not the third magnet 56, or may include the third magnet 56 and not the second magnet 54.

For example, the pillar trim 32 may include a hole (not numbered) extending through the surface 34 of the pillar trim 32 in the cross-vehicle direction D, and the second magnet 54 may be fixed to the pillar trim 32 in the hole (not numbered). As another example, the second magnet 54 may be fixed directly to the surface 34 of the pillar trim 32. The second magnet 54 may be fixed to the pillar trim 32 in any suitable manner, e.g., fasteners, clips, adhesive, etc.

Figure 3B:
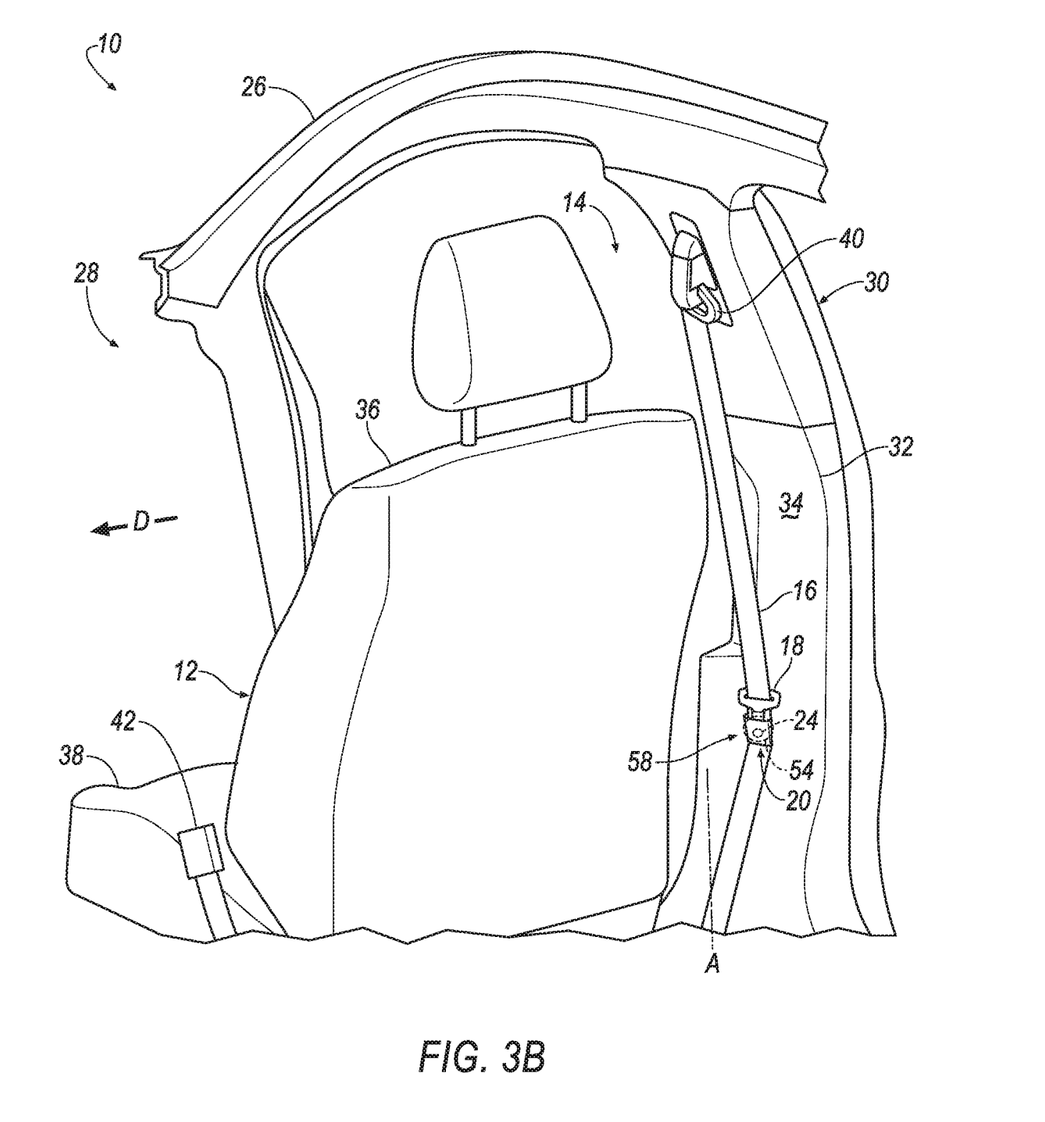
FIG. 3B is a perspective view of the magnet engaged with the second magnet.

With reference to FIG. 3B, the second magnet 54 may be engageable with the seatbelt assembly 14. Specifically, the second magnet 54 is engageable with the magnet 24. The second magnet 54 fixes the magnet 24, i.e., the webbing 16, relative to the pillar trim 32 when the second magnet 54 engages the magnet 24. The second magnet 54 may, for example, be spaced from the magnet 24 in the cross-vehicle direction D. The second magnet 54 may be the same or different type of magnet as the magnet 24. The second magnet 54 may have a same or different shape as the magnet 24.

With reference to FIG. 4A, in addition to, or in the alternative to the second magnet 54, the anti-rattle system 58 may include the third magnet 56 fixed to the seatback 36. For example, the seatback 36 may include a hole (not numbered) extending through one side of the seatback 36 in the cross-vehicle direction D, and the third magnet 56 may be fixed to the seatback 36 in the hole (not numbered). As another example, the third magnet 56 may be fixed directly to the side of the seatback 36. The third magnet 56 may be fixed to the seatback 36 in any suitable manner, e.g., fasteners, clips, adhesive, etc.

Figure 4B:
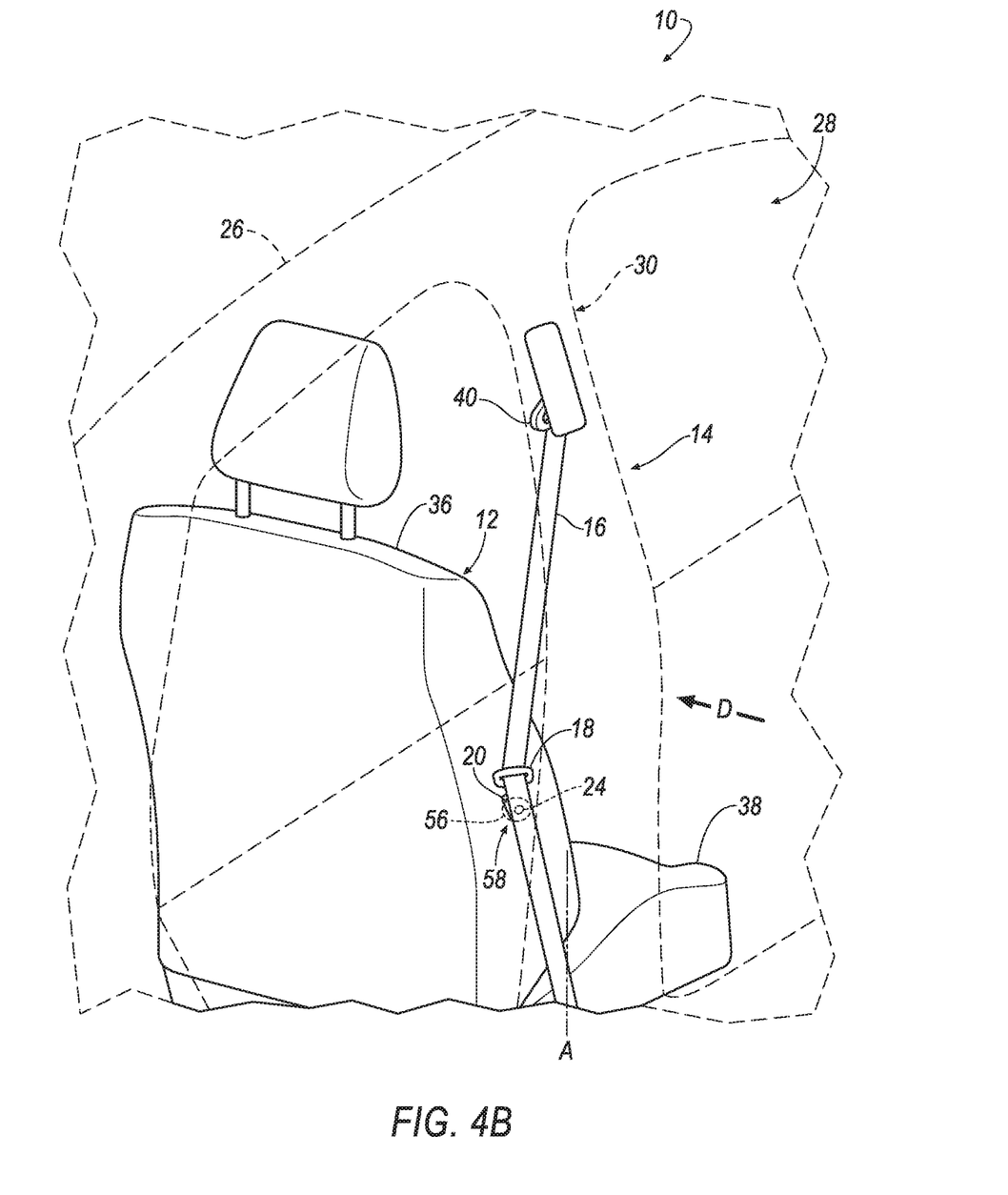
FIG. 4B is a perspective view of the tongue engaged with the third magnet.

With reference to FIG. 4B, the third magnet 56 may be engageable with the seatbelt assembly 14. Specifically, the third magnet 56 is engageable with the tongue 18. The third magnet 56 fixes the tongue 18 relative to the seat 12, e.g., the seatback 36, when the third magnet 56 engages the magnet 24. The third magnet 56 may, for example, be spaced from the tongue 18 in the cross-vehicle direction D. The third magnet 56 may be the same or different type of magnet as the magnet 24. The third magnet 56 may have a same or different shape as the magnet 24.

Each of the magnet 24, the second magnet 54, and the third magnet 56 has two poles, i.e., a north pole and a south pole. Each of the magnets 24, 54, 56 may be positioned such that the magnet 24 is magnetically attracted to the second magnet 54 and the third magnet 56. For example, the north pole of the magnet 24 may face the south pole of the second magnet 54, and the south pole of the magnet 24 may face the north pole of the third magnet 56. As another example, the north pole of the magnet 24 may face the south pole of the third magnet 56, and the south pole of the magnet 24 may face the north pole of the second magnet 54. In other words, the north poles of each magnet may face in the same direction.

The tongue 18 may be formed of any suitable magnetic material. For example, the tongue 18 may be formed rare earth elements, e.g., elements in the lanthanide series, scandium, and yttrium. Alternatively, the tongue 18 may be formed of ferromagnetic material, e.g., iron, nickel, cobalt, etc.

The tongue 18 may be moveable from an engaged position to the disengaged position. In the engaged position, the tongue 18 is locked in the buckle 42, e.g., fixed to the buckle 42. When the tongue 18 is in the engaged position, the tongue 18 divides the webbing 16 into a lap band a shoulder band. In this situation, the tongue 18 may be fixed relative to the vehicle 10, e.g., the vehicle body 26 and the seat 12. In the disengaged position, the tongue 18 is released from the buckle 42, i.e., spaced from the buckle 42. Additionally, the tongue 18 may be spaced from the pocket 20 in the disengaged position, as shown in FIG. 1B. In this situation, the tongue 18 may be moveable relative to the webbing 16 along the webbing axis A, e.g., the tongue 18 may freely slide along the webbing axis A. In other words, the tongue 18 may be moveable relative to the vehicle 10, e.g., the vehicle body 26 and the seat 12.

With reference to FIG. 2A, the tongue 18 may be engageable with the pocket 20 in the stowed position. For example, the tongue 18 may be moveable relative to the webbing 16 to the stowed position in the cavity 22. In other words, the tongue 18 may be disposed in the cavity 22 when the tongue 18 is in the stowed position, i.e., between the webbing 16 and the pocket 20, as shown in FIG. 2B. As another example, the tongue 18 may be moveable to an external position adjacent the pocket 20 external to the cavity 22, as shown in FIG. 2C. In this situation, the pocket 20 may be sandwiched between the tongue 18 and the magnet 24.

Additionally, the tongue 18 is releasably engaged with the magnet 24 when the tongue 18 is in the stowed position. For example, when the tongue 18 slides along the webbing 16 to the magnet 24, the magnet 24 may magnetically attract the tongue 18 such that the tongue 18 engages the magnet 24 in the stowed position. The tongue 18 may, for example, be in direct contact with the magnet 24 in the stowed position, e.g., when the tongue 18 is disposed in the cavity 22, as shown in FIG. 2B. Alternatively, the tongue 18 may be in indirect contact with the magnet 24 in the stowed position, e.g., when the tongue 18 is in the external position. In other words, the magnet 24 may engage, i.e., magnetically attract, the tongue 18 through the pocket 20, as shown in FIG. 2C. When the tongue 18 is engaged with the magnet 24, the tongue 18 is fixed relative to the webbing 16. By engaging the tongue 18 in the stowed position, the magnet 24 and/or the pocket 20 may prevent the tongue 18 from sliding along the webbing 16 to the floor of the vehicle 10, which may allow for the elimination of a webbing stop (i.e., excess webbing material and/or a hard stop fixed to the webbing 16 to prevent the tongue 18 from sliding along the webbing 16 to the floor of the vehicle 10). In other words, the magnet 24 and/or the pocket 20 perform the function of a webbing stop. The magnet 24 and/or the pocket 20 may be positioned at any suitable position along the webbing 16 such that the tongue 18 may be easily accessible by the occupant when the tongue 18 is in the stowed position.

The tongue 18 may be moveable on the webbing 16 in the cross-vehicle direction D to one of a first position, as shown in FIG. 3B, and a second position, as shown in FIG. 4B. In other words, the tongue 18 may pull the webbing 16 in the cross-vehicle direction D. The tongue 18 may be move to one of the first position and the second position due to vibration during operation of the vehicle 10. In the first position, the tongue 18 is adjacent to the pillar trim 32, e.g., the webbing 16 may curve along the webbing axis A towards the pillar trim 32. When the tongue 18 is in the first position, the magnet 24 engages the second magnet 54 such that the tongue 18 is fixed relative to the pillar trim 32, as shown in FIG. 3B.

In the second position, the tongue 18 is adjacent to the seatback 36, e.g., the webbing 16 may curve along the webbing axis A towards the seatback 36. When the tongue 18 is in the second position, the third magnet 56 engages the tongue 18 such that the tongue 18 is fixed relative to the seatback 36, as shown in FIG. 4B. In this situation, the tongue 18 may be simultaneously engageable with the magnet 24 and the third magnet 56 between the magnet 24 and the third magnet 56 when the tongue 18 is in the second position. In the second position, the tongue 18 may be in indirect contact with the third magnet 56, e.g., when the tongue 18 is disposed in the pocket 20, as shown in FIG. 4B. In other words, the tongue 18 may be engaged with the third magnet 56 through the pocket 20. Alternatively, the tongue 18 may be in direct contact with the third magnet 56 in the second position, e.g., when the tongue 18 is in the external position.

During operation of the vehicle 10, the tongue 18 may be engaged with the buckle 42 in the engaged position. When the tongue 18 is released to the disengaged position, the tongue 18 may be spaced from the anti-rattle system 58, as shown in FIG. 1A, and moveable towards the anti-rattle system 58. As the tongue 18 slides along the webbing 16, the tongue 18 may engage the magnet 24 in the stowed position, as shown in FIG. 2A. When the tongue 18 is in the stowed position, the tongue 18 may be fixed relative to the webbing 16. In the stowed position, the tongue 18 may be disposed in the cavity 22, as shown in FIG. 2B, or in the external position, as shown in FIG. 2C. The tongue 18 and the webbing 16 may be moveable together in the cross-vehicle direction D to one of the first position and the second position due to vibration from operation of the vehicle 10 when the tongue 18 is in the stowed position. When the tongue 18 and the webbing 16 move to the first position the second magnet 54 engages the magnet 24 to fix the tongue 18 and the webbing 16 relative to the pillar trim 32, as shown in FIG. 3B. When the tongue 18 and the webbing 16 move to the second position the third magnet 56 engages the tongue 18 to fix the tongue 18 and the webbing 16 relative to the seatback 36, as shown in FIG. 4B. By the anti-rattle system 58 engaging the tongue 18, the magnet 24 can fix the tongue 18 relative to the webbing 16, which can limit vibration of the tongue 18 on the webbing 16. Additionally, the anti-rattle system 58, e.g., one of the second magnet 54 and the third magnet 56, can limit the movement of the tongue 18 relative to the vehicle components, which can prevent the tongue 18 from impacting one of the pillar trim 32 and the seatback 36. In other words, the anti-rattle system 58 can reduce sound in the passenger cabin 28 due to the tongue 18 vibrating on the webbing and/or impacting one of the pillar trim 32 and the seatback 36 when the tongue 18 is disengaged from the buckle 42.

The disclosure has been described in an illustrative manner, and it is to be understood that the terminology which has been used is intended to be in the nature of words of description rather than of limitation. The terms "first," "second," and "third" are used throughout this disclosure merely as identifiers, and not to indicate order or importance. Many modifications and variations of the present disclosure are possible in light of the above teachings, and the disclosure may be practiced otherwise than as specifically described.

What is claimed is:

1. A system comprising:
   a vehicle body;
   a pillar trim attached to the vehicle body and a seat spaced from the pillar trim, the seat includes a seat bottom and a seatback supported by the seat bottom;
   the seatback includes a side facing the pillar trim;
   a seatbelt assembly attached to the vehicle body and disposed between the pillar trim and the side of the seatback, the seatbelt assembly including a webbing and a tongue slidably engaged with the webbing;
   a pocket fixed to the webbing between the pillar trim and the side of the seatback, the pocket and the webbing defining a cavity therebetween;
   a magnet disposed in the cavity and engageable with the tongue, the magnet fixed to the webbing;
   a second magnet fixed to the pillar trim and engageable with the magnet; and
   a third magnet fixed to the side of the seatback and facing the pillar trim with the magnet and the pocket being between the second magnet and the third magnet, the third magnet engageable with the tongue.

2. The system of claim 1, wherein the webbing is elongated along a webbing axis, the tongue being moveable relative to the webbing along the webbing axis.

3. The system of claim 2, wherein the magnet is disposed along the webbing axis.

4. The system of claim 1, wherein the tongue is moveable to a stowed position in the cavity, the tongue being releasably engaged with the magnet in the stowed position.

5. The system of claim 4, wherein the tongue is moveable to an external position adjacent the pocket external to the cavity, the pocket being sandwiched between the tongue and the magnet when the tongue is in the external position.

6. The system of claim 1, wherein the pocket is positioned to selectively receive the tongue.

7. The system of claim 1, the tongue being simultaneously engageable with the magnet and the third magnet between the magnet and the third magnet.

8. The system of claim 1, wherein the magnet, the second magnet, and the third magnet each include a north pole and a south pole, the north poles of each magnet face in the same direction along a cross-vehicle axis.

\* \* \* \* \*